United States Patent [19]
Gaul et al.

[11] 3,800,201
[45] Mar. 26, 1974

[54] ELECTROMECHANICAL VALVE POSITIONING APPARATUS

[75] Inventors: Alan R. Gaul, Mansfield, Mass.; Raymond Villier, Conde-sur-Noireau, France

[73] Assignee: Masoneilan International, Inc., Norwood, Mass.

[22] Filed: Aug. 28, 1972

[21] Appl. No.: 284,153

[52] U.S. Cl. .......................... 318/283, 318/207
[51] Int. Cl. .................................. H02p 1/42
[58] Field of Search ............... 318/283-286, 318/484, 207, 227

[56] References Cited
UNITED STATES PATENTS
3,551,770  12/1970  Isaacs............................ 318/283 X
3,124,732  3/1964   Dupy.............................. 318/283 X
3,092,765  6/1963   Vesper et al.................... 318/283 X Primary Examiner—Bernard A. Gilheany
Assistant Examiner—W. E. Duncanson, Jr.
Attorney, Agent, or Firm—Chittick, Thompson & Pfund

[57] ABSTRACT

An electromechanical valve positioning apparatus having a control circuit for driving a stepping motor to position a valve regulating flow of a medium within a conduit in response to a pair of input signals indicating respectively whether the valve should be opened or closed. The control circuit contains a pair of oscillating driving circuits for driving the motor in opposite directions, each driving circuit being operated in response to a respective input signal. Each driving circuit has an associated timing circuit for disabling it after its respective input signal has occurred for a predetermined period so that the motor is not driven for an indefinite period after the valve has reached an extreme or seated position. Preferably, each timing circuit includes a timing capacitor which is charged in response to its respective input signal and a unijunction transistor which is connected to the capacitor for firing a pulse when the capacitor has been charged to a predetermined level. Upon firing, each unijunction transistor gates an SCR for terminating operation of the associated driving circuit. The SCR remains in this state preventing driving of the motor until the other input signal is received indicating that the motor is to be driven in its other direction.

11 Claims, 8 Drawing Figures

ELECTROMECHANICAL VALVE POSITIONING APPARATUS

BACKGROUND OF THE INVENTION

This invention relates to an apparatus for positioning a valve within a conduit automatically in response to a sensed characteristic of the medium flowing within the conduit and, more particularly, to such an apparatus which operates electromechanically.

Prior valve positioning systems have generally been pneumatic. However, present day electronic components have advanced to the point where they are gaining in favor for valve positioning systems as well as in other areas of process control.

Electromechanical valve positioning apparatus which control a motor connected to the valve by bidirectionally driving it with successive pulses have previously been used. However, such prior apparatus generally have continually provided pulses to the motor so that the motor continued to be driven after the valve had reached its seat or maximum position. Obviously, such continued driving of the motor to force the valve against its seat, produces unnecessary stresses and current is wasted. Mechanical limit switches have been considered but these are generally difficult to adjust with the precision required for shutting off the motor at the valve seat.

OBJECTS AND SUMMARY OF THE INVENTION

It is, therefore, the general object of this invention to provide a valve positioning apparatus which is electromechanical, reliable, and low in cost, from the standpoints both of initial construction and of operational maintenance.

It is a further object to provide a circuit for controlling operation of a motor connected to the valve in such an apparatus.

It is an additional object to provide such an apparatus where the motor is not driven indefinitely after the valve has reached an extreme or seated position.

It is a further object to provide a timing circuit which is particularly adapted to prevent the motor from indefinitely forcing the valve against its seat.

These and other objects are achieved by the invention where a motor connected and adapted to position a valve is controlled by a pair of inputs indicating in which of two directions the valve is to be positioned. A first driving circuit is provided to drive the motor for positioning the valve in one direction in response to one of the input signals while the other input signal causes a second driving circuit to operate to drive the motor in the other direction. Each of the driving circuits is disabled by an associated timing circuit after its associated input signal has been received for a predetermined period and, upon being so disabled, each driving circuit remains in that state until the other input signal is received. By setting the predetermined period of each timing circuit appropriately, an apparatus is provided in which the motor does not indefinitely force the valve against its seat.

Preferably, each timing circuit comprises a capacitor which is connected to a circuit element that fires an output when the capacitor has been charged to a predetermined level. Charging of the capacitor occurs while the circuits associated input signal is being received. Firing of the circuit element enables a gate which causes the associated driving circuit to be disabled. The gate is thereafter reset when the other input signal is received.

DESCRIPTION OF THE PREFERRED EMBODIMENTS

Figure 1:
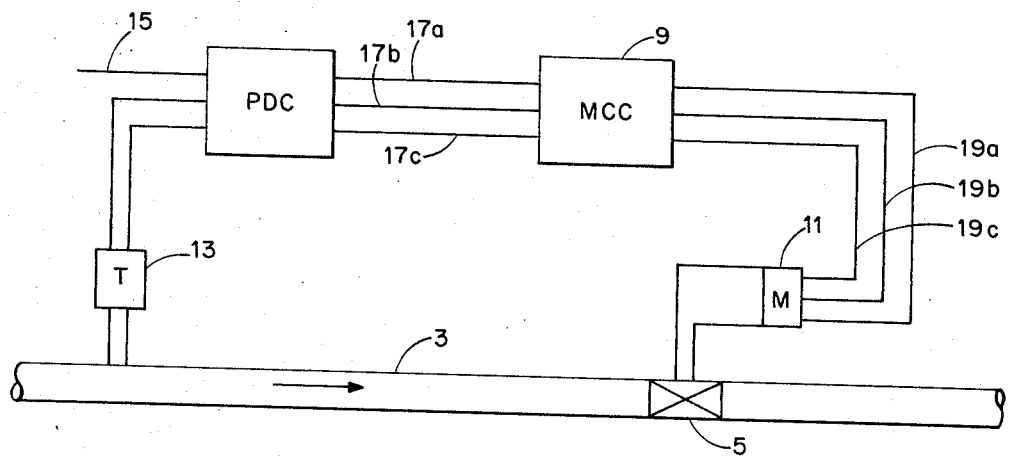
FIG. 1 is a block diagram illustrating a valve positioning system embodying a preferred embodiment of the invention.

FIG. 1 shows an electromechanical valve positioning system where a motor 11 is operatively connected to a suitable valve 5, such as a rotary valve or reciprocating valve, to regulate the flow of a medium within a conduit 3. The system's input information for determining whether the valve 5 is to open or close is obtained by a transducer 13 positioned upstream from the valve 5. However, the transducer could be positioned downstream if desired. The transducer 13 is adapted to sense the characteristic (velocity, temperature, etc.) of the medium in response to which the valve 5 is positioned. The transducer provides electrical impulses to an electronic pulse duration controller (PDC) 7 which provides positive output D. C. signals on line 17a when the valve is to be moved in a first direction and positive output D. C. signals on line 17b when the valve is to be moved in the other direction. Both the transducer 13 and pulse duration controller 7 are commercially available devices known in the art. The pulse duration controller 7 is responsive to signals on a designator input 15 as well as to the transducer. The signals on input 15 designate the desired set point of the medium's characteristic being sensed and are compared with signals from the transducer 13 to cause the pulse duration controller 7 to provide the correct outputs on lines 17a and 17b in response to any error difference.

A motor control circuit (MCC) 9 receives the signals from the pulse duration controller 7 on lines 17a and 17b as well as a ground signal on a third line 17c. The motor control circuit 9 operates to provide an oscillating drive signal on line 19a to drive the motor 11 in a first direction in response to D.C. signals from the pulse duration controller 7 on line 17a. Conversely, the motor control circuit 9 feeds an oscillating signal on line 19b to drive the motor in the opposite direction in response to D.C. signals on line 17b. With line 19c the motor control circuit 9 feeds the motor 11 with a braking signal when appropriate. In response to the motor control circuit 9, the motor 11 operates in either direction to correctly position the valve 5.

Figure 2:
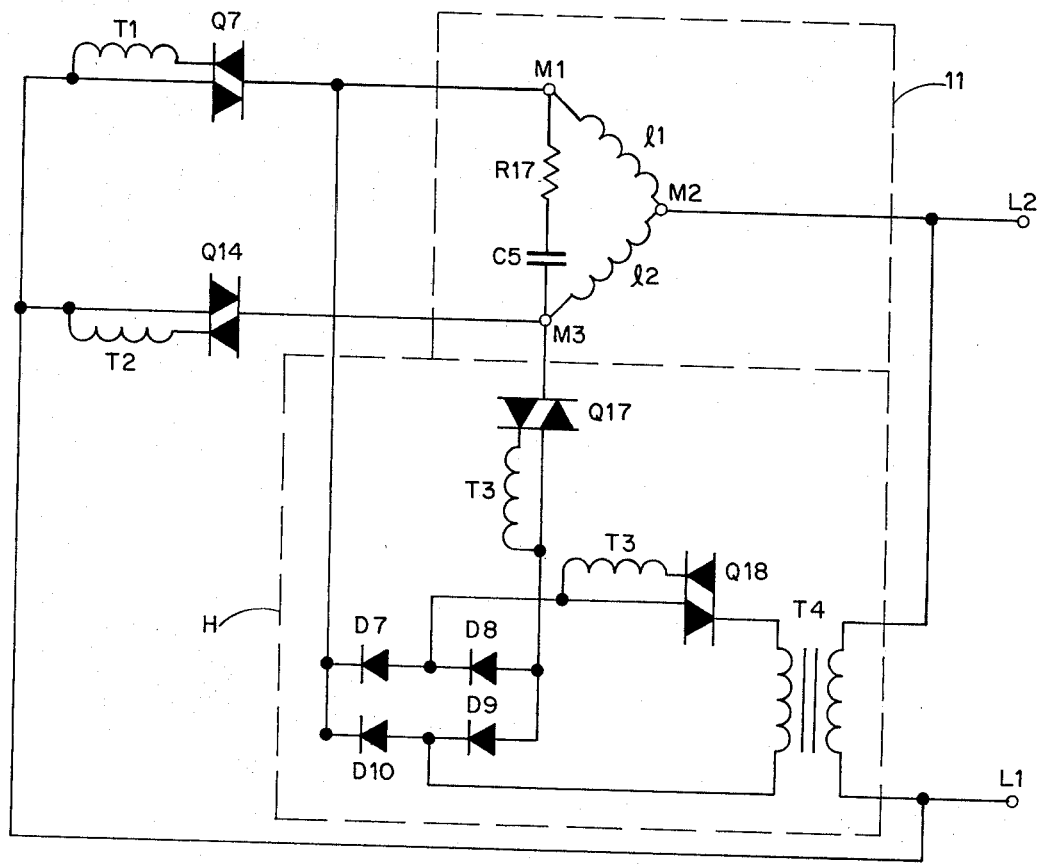
FIG. 2 is a schematic diagram of an A.C. motor shown as a block in FIG. 1 and a portion of its associated braking circuitry.

Referring to FIG. 2, the motor 11 shown as a block in FIG. 1 is schematically illustrated. The motor is an A.C. stepping motor of the SloSyn wired type and contains a pair of windings, $l_1$ and $l_2$. Winding $l_1$ is connected between terminals M1 and M2 of the motor; $l_2$ is connected between terminals M2 and M3 of the motor. Between the motor's terminals M1 and M3 are connected in series a phase shifting resistor R17 and capacitor C5 associated with the motor. The motor is driven by a usual A.C. input such as a 115 volt, 60 cycle or a 220 volt, 50 cycle A.C. input which is applied between terminals $L_2$ and $L_1$. Terminal $L_2$ is connected to terminal M2 of the motor and the motor's terminals M1 and M3 are connected through a pair of switching triacs Q7, Q14 to the terminal $L_1$. When the terminal $L_1$ is operatively connected to the motor's terminal M1, the A.C. voltage is applied across windings $l_1$ and $l_2$ to drive the motor in a clockwise direction and move the valve in one direction while when the terminal $L_1$ is operatively connected to motor's terminal M3, the A.C. voltage is applied across the windings to drive the motor in a counterclockwise direction and move the valve in the opposite direction. As shown, the pair of switching triacs Q7 and Q14 are adapted to be selectively enabled by energizing the secondary windings of pulse transformers T1 and T2, respectively, which are shown in FIG. 2. When winding T1 is energized, triac Q7 is enabled to cause the A.C. driving voltage to be applied to terminal M1 and when winding T2 is energized triac Q14 is enabled to cause the A.C. driving voltage to be applied to terminal M3. Obviously, windings T1 and T2 are energized in a mutually exclusive manner.

Figure 3:
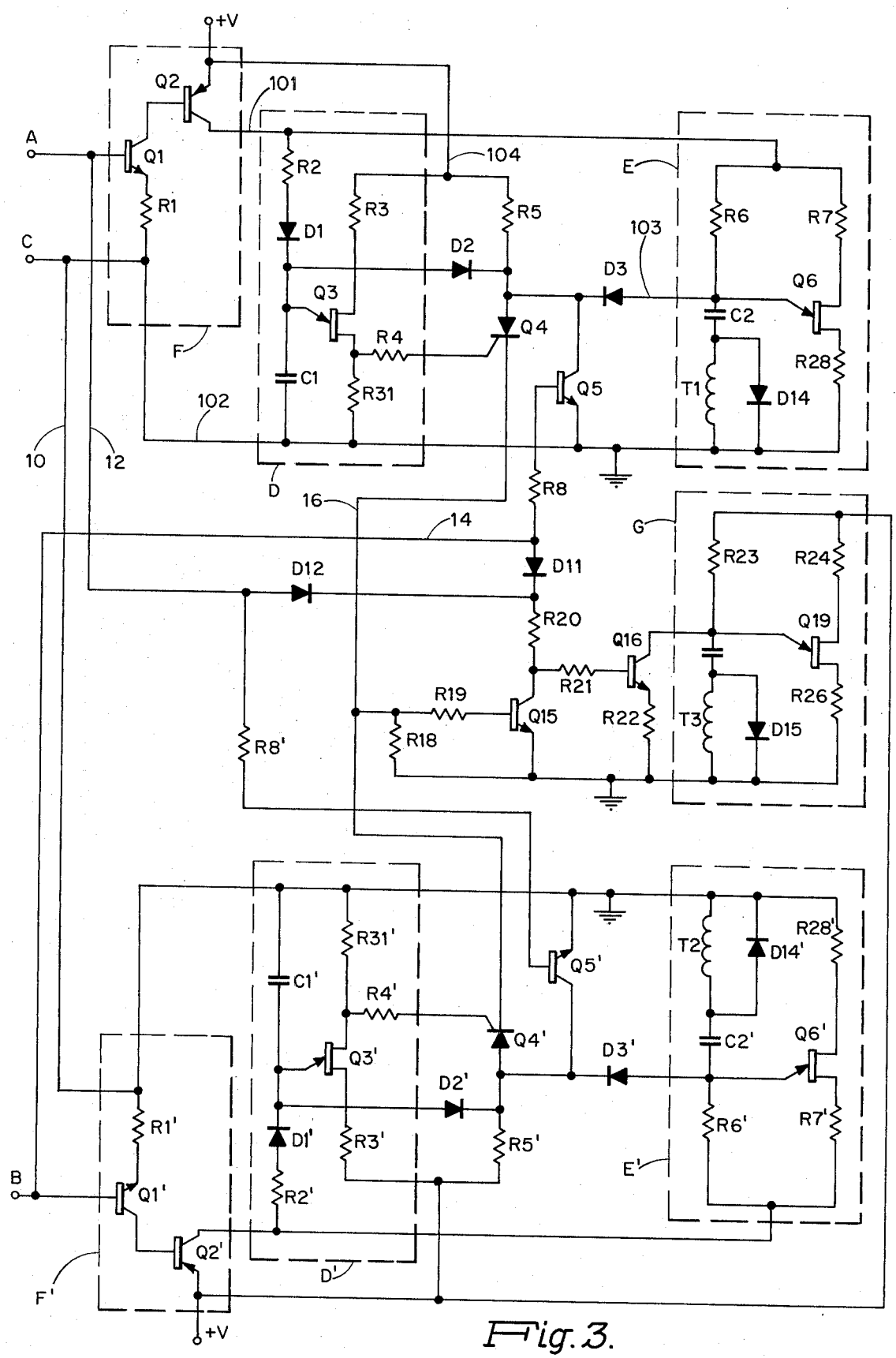
FIG. 3 is a schematic diagram of the motor control circuit shown as a block in FIG. 1.

Windings T1 and T2 are selectively energized by the motor control circuit 9 shown as a block in FIG. 1 and illustrated in FIG. 3. Lines 19a and 19b in FIG. 1 correspond, respectively, to pulse transformers T1 and T2. The pulse transformers T1 and T2 also serve to isolate the A.C. excited motor windings from the control circuit.

Referring to FIG. 3, terminals A and B receive the D.C. signals on lines 17a and 17b from the pulse duration controller 7 shown in FIG. 1. Terminal C is connected to line 17c for a ground. A D.C. signal applied to terminal A from line 17a indicates that the motor is to be driven in the clockwise direction for positioning the valve and a D.C. signal applied to input terminal B from lead 17b indicates that the motor is to be driven in the counterclockwise direction. Driving the motor in this manner is accomplished by energizing the primary winding of pulse transformer T1 or by energizing the primary winding of pulse transformer T2, both of which are shown in FIG. 3. As above noted, the secondary windings of pulse transformers T1 and T2 shown in FIG. 2 operate to cause the driving voltage to be applied across the appropriate winding of the A.C. motor. Besides receiving input signals on terminals A, B, and C, the control circuit shown in FIG. 3 receives a positive D.C. voltage from a +V source at two locations.

As shown in FIG. 3, terminal A has associated therewith a switching subcircuit indicated by the block F, a timing subcircuit indicated by D, and driving subcircuit indicated by E. Similar corresponding subcircuits F', D', and E' are associated with terminal B. Since the elements associated with terminal B correspond to those associated with terminal A, only those associated with terminal A will be described. Each element associated with terminal B has been given the same reference numeral as its corresponding element associated with terminal A except that it is primed.

In switching subcircuit F of FIG. 3, a transistor Q1 is provided with its base connected to terminal A, its collector electrode connected to the base of another transistor Q2 and its emitter electrode connected through a resistor R1 to ground. The emitter electrode of transistor Q2 is connected to the positive +V voltage source and the collector electrode of transistor Q2 is connected to provide a signal on lead 101 to the timing sub-circuit D. The +V voltage source is, in the preferred embodiment, +20 volts and the D.C. signals applied to terminal A and B are also +20 volts. Switching subcircuit F acts to apply voltage from the +V source to the timing and driving subcircuits D and E via lead 101 in response to a signal on input terminal A. Resistor R1 in subcircuit F serves to limit the emitter-base current of transistor Q2.

The driving subcircuit E comprises a leg connected between the output of switching subcircuit F and ground and consisting of a resistor R6, a capacitor C2 and the primary winding of the pulse transformer T1 in parallel with a diode D14. The driving subcircuit E also includes a second leg in parallel with the first and containing a resistor R7, a unijunction transistor Q6 and another resistor R28. As shown, the emitter of the unijunction transistor Q6 is connected to a junction between the capacitor C2 and resistor R6 and to the timing subcircuit D over lead 103. Driving subcircuit E operates to provide an oscillating signal on pulse transformer T1 to drive the motor in a clockwise direction. The unijunction transistor Q6 is oscillated at a frequency determined by the values of resistor R6 and capacitor C2. The oscillation rate is preferably set at a sufficiently high frequency to ensure energizing the pulse transformer T1 in response to a signal at terminal A to fire its associated triac Q7 (FIG. 2) at least once during each cycle of the A.C. voltage applied across terminals L1 and L2.

Thus, while a signal is received at input terminal A, switching subcircuit F turns on to cause oscillations in subcircuit E over the primary winding of pulse transformer T1. This causes the motor to be driven in a clockwise direction. However, as noted above, a deficiency in the prior art which is overcome with the invention is that previous electromechanical valve positioning apparatus continued to drive the motor indefinitely to position the valve even after the valve was at a maximum or seated position. To overcome this problem, the invention employs the timing subcircuit D.

As shown in FIG. 3, timing subcircuit D includes a resistor R2, a blocking diode D1 and a timing capacitor C1 connected between ground and the output lead 101 of the switching subcircuit F. The timing subcircuit also includes a unijunction transistor Q3 having its emitter connected to a junction between diode D1 and capacitor C1. Resistors R3 and R31 are connected on opposite sides of the unijunction transistor Q3 and between the +V source and ground. Another resistor R4 is also connected between the unijunction transistor Q3 and the gate electrode of an SCR Q4. The timing circuit D and, more particularly, the time constant of R2C1 determines the maximum amount of time which the motor may be driven in response to an input signal at terminal A without an intervening signal being provided at terminal B. When the switching subcircuit F goes on in response to a signal at A, the timing capacitor C1 is charged through resistor R2 until the firing level of the unijunction transistor Q3 is reached. When the firing level of Q3 is reached, the capacitor C1 discharges and a pulse is fed through resistor R4 to the gate electrode of SCR Q4.

The blocking diode D1 is provided to prevent discharge of the capacitor C1 during any intervals which may occur when the switching subcircuit F is off and a signal does not appear at terminal A. Resistor R3 connected between the +V voltage source and the unijunction transistor Q3 maintains the firing level of the unijunction transistor and prevents its firing as the switching subcircuit F and transistor Q2 turn off.

As illustrated, the anode of SCR Q4 is connected via a diode D3 to the junction between the resistor R6 and capacitor C2 and to the emitter of the unijunction transistor Q6 in the driving subcircuit E. When the SCR receives its gating pulse, it drops the voltage at the emitter of unijunction transistor Q6 to prevent it from oscillating so that the driving subcircuit E stops providing pulses to the motor via its pulse transformer T1. In this manner, charging of the capacitor C1 while a signal is received at terminal A to the firing level of the unijunction transistor Q3 gates SCR Q4 to terminate energizing oscillations on pulse transformer T1 for driving the motor in a clockwise direction. Thus, after a predetermined quantity of input signals are received at terminal A, the motor is no longer able to be driven clockwise.

Resistor R5, connected between the +V source and SCR Q4, insures that sufficient current is maintained through the SCR to keep it in its gated state when the switching subcircuit is off. The diode D3 and another diode D2 connected between the register R5 and capacitors C2 and C1, respectively, serve blocking functions preventing charging of capacitors C1 and C2 through resistor R5 when the SCR Q4 is not gated.

Once gated by a pulse through resistor R4, SCR Q4 will remain in its state preventing clockwise driving of the motor until it is reset. During this state, it also prevents further charging of capacitor C1 by maintaining the voltage at the emitter of Q3 below its firing level. Resetting of Q4 is accomplished by a pulse on lead 14 which is connected between terminal B and through a resistor R8 to the base of a transistor Q5 which is connected with its emitter electrode at ground and its collector electrode at the anode of the SCR. In response to a signal from terminal B on lead 14, the transistor Q5 will switch to drop the current passing through SCR Q4 and thereby reset it to its initial non-gated state. The motor may thereafter be driven clockwise in response to signals at terminal A.

It should also be noted that each successive resetting of Q4 causes the voltage at the emitter of Q3 to drop below its firing level causing C1 to be discharged to its initial state.

As may be seen, by appropriately selecting resistor R2 and capacitor C1, the maximum time during which the motor may be continually driven in the clockwise direction may be set. This maximum time is chosen in response to the maximum amount of possible valve travel; for example, these components may be selected so that the motor may be driven for a continual period no longer than is necessary for the valve to move a distance of twice its stroke. In this manner, continual indefinite pulsing of the motor driving the valve against its seat is avoided.

Of course, the corresponding elements associated with terminal B operate in the same manner as disclosed above. Switching subcircuit F' applies positive voltage to the timing and driving subcircuits, D' and E', in response to a signal at terminal B. This causes the driving subcircuit E' to drive the motor counterclockwise via transformer T2 until the timing capacitor C2' is sufficiently charged to fire unijunction transistor Q3' and gate SCR Q4'. At this time the motor can no longer be driven counterclockwise until a signal occurs on terminal A which resets the SCR Q4'.

Referring back to FIG. 2, the invention provides means for applying a brake to the motor when it is not being driven. A portion of a braking circuit H is shown in FIG. 2 and this cooperates with diodes D11 and D12, resistors R18–R22, transistors Q15 and Q16, and subcircuit G in FIG. 3 to apply a braking voltage to both the motor's windings $l_1$ and $l_2$ when neither terminal A nor terminal B have signals applied thereto. In subcircuit H of FIG. 2, a transformer T4 is provided with its primary winding connected for excitation between terminals L1 and L2 having the applied A.C. driving signal. The output from the secondary of transformer T4 is rectified to D.C. by a diode bridge made up of diodes D7–D10 to provide a D.C. braking voltage which is applied to both terminals M1 and M3 of the motor and across windings $l_1$ and $l_2$. This braking voltage is applied when triacs Q17 and Q18 are simultaneously enabled by the secondary windings of another pulse transformer T3. Triac Q18 connected between the transformer T4 and diode bridge ensures that triac Q17 is responsive to the winding of T3 when the brake is to be removed. The primary winding of pulse transformer T3 is shown in circuit G in FIG. 3 and the transformer T3 corresponds to line 19c in FIG. 1.

As shown in FIG. 2 and as above noted, the rectified D.C. output of subcircuit H is connected to both terminals M1 and M3 of the motor. With this arrangement, resistor R17 and capacitor C5 connected in parallel with the motor's leads, help to cancel the circuits inherent inductive characteristics which could possibly cause triac Q17 to be incorrectly enabled. Additionally, the arrangement shown places the resistor R17 in a position where it may prevent a direct short circuit which might occur if a triac was improperly enabled.

The two secondary windings of pulse transformer T3 shown in FIG. 2 are periodically excited by oscillations on the transformer's primary winding in subcircuit G shown in FIG. 3. Subcircuit G is constructed and operates similar to driving subcircuits E and E'. It contains resistors R23, R24, and R26, a unijunction transistor Q19, a capacitor C6, a diode D15, as well as the primary winding of the pulse transformer T3. Subcircuit G operates at the same frequency as does the driving subcircuits E and E' and has its elements connected in the same manner except that both its legs receive +V voltage directly from the source and not through a switching subcircuit.

As shown in FIG. 3, subcircuit G providing the oscillations for braking is controlled by the output from a transistor Q16. When a signal is applied at either terminal A or B, transistor Q16 is turned on to allow the voltage across capacitor C6 in subcircuit G to drop below the firing level of the unijunction transistor Q19 so that the pulse transformer T3 is not energized and the braking voltage is not applied to the motor. The D.C. signals applied to terminal A are fed via lead 12 through diode D12 and resistors R20 and R21 to the base of transistor Q16 for this purpose. Similarly, signals on terminal B are fed via lead 14 through diode D11 and resistors R20 and R21 to transistor Q16. When signals are not applied to terminals A or B, transistor Q16 remains off and allows subcircuit G to oscillate and the motor to be braked.

When either SCR Q4 or SCR Q4' is gated so that the motor is not to be driven a braking voltage is applied. When an SCR is gated a voltage drop occurs across resistor R18 connected via lead 16 between the cathodes of the SCR 's Q4 and Q4' and ground. This voltage drop is applied to the base of transistor Q15 through resistor R19 to turn the transistor on and remove base drive from transistor Q16. Thus, the voltage across capacitor C6 in subcircuit G is allowed to increase to the firing level of the unijunction transistor Q19 so that oscillations occur for energizing the braking pulse transformer T3. In this manner, the D.C. braking voltage is periodically applied to the motor either when a signal is not being applied to terminals A or B or when a timing subcircuit, D or D', indicates that the motor has been driven the maximum amount and gates an SCR.

Figure 4:
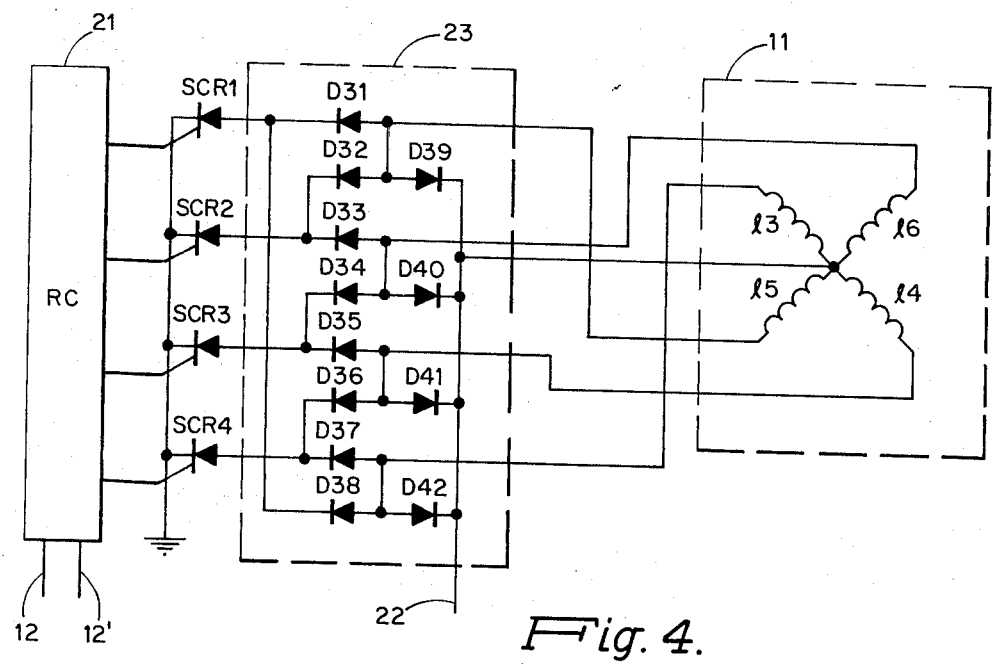
FIG. 4 is a schematic diagram of a D.C. motor and a portion of its control circuitry used in a modified embodiment of the invention.
Figure 6:
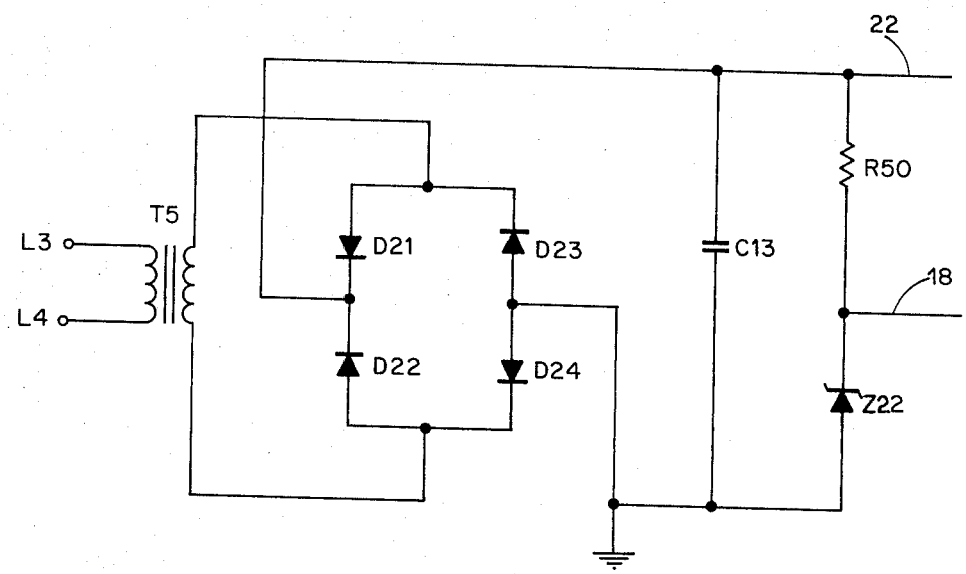
FIG. 6 is a schematic diagram of a power supply source for the modified embodiment of the invention shown in FIGS. 4 and 5.
Figure 5:
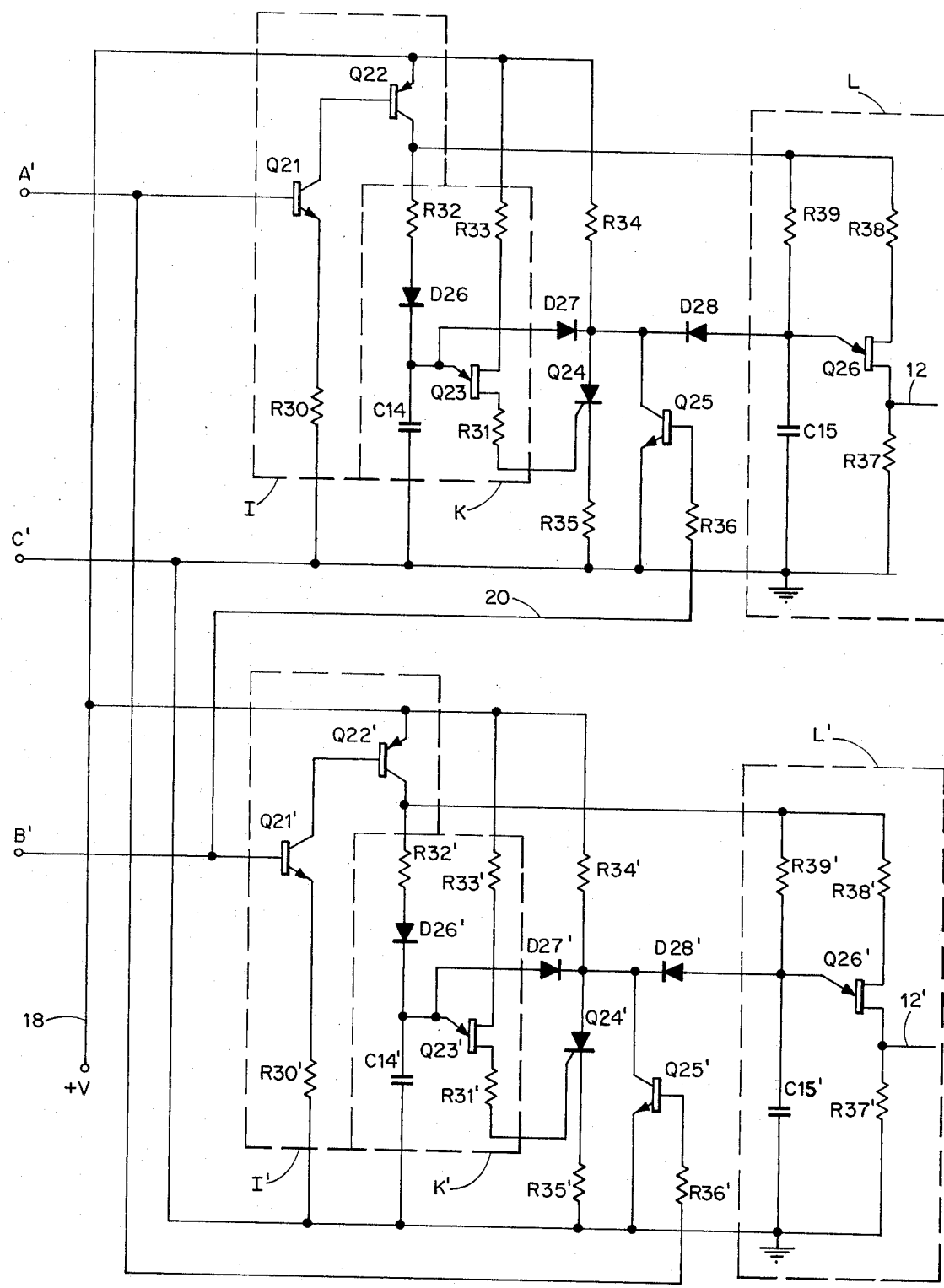
FIG. 5 is a schematic diagram of the main portion of a circuit for controlling the D.C. motor shown in FIG. 4.

FIGS. 4, 5, and 6 illustrate a modified embodiment of the invention where a D.C. stepping motor of the SloSyn bifilar wound type is used. As shown in FIG. 4, the motor 11' has four windings $1_3$–$1_6$ which are selectively energized in pairs in two sequences; one sequence driving the motor clockwise and the other driving the motor counterclockwise.

For clockwise rotation, pairs of the windings are energized in the following sequence: $1_6$ and $1_5$; $1_6$ and $1_4$; $1_3$ and $1_4$; $1_3$ and $1_5$; $1_6$ and $1_5$; etc. For counterclockwise rotation, pairs of the windings are energized in the following sequence: $1_6$ and $1_5$; $1_3$ and $1_5$; $1_3$ and $1_4$; $1_6$ and $1_4$; $1_6$ and $1_5$; etc.

This sequential energization is accomplished with the bidirectional, four-stage ring counter (RC) 21, four SCR's, SCR1-SCR4, and a diode encoding circuit 23 having diodes D31-D42 arranged as shown and connecting the SCR'swith the motor's windings. The ring counter is advanced in its forward direction by successive pulses on lead 12 while successive pulses on lead 12' step the counter in its reverse direction. Each of the four stages of the counter is connected to a gate electrode of one of the SCR's so that SCR's 1 through 4 are successively gated in response to stepping of the counter. The cathode of the SCR's are connected to a ground reference.

The encoding circuit 23 receives a positive D.C. voltage for driving the motor 11' on lead 22 and this voltage is applied at the common point of windings $1_3$–$1_6$. The diodes are arranged so that a circuit is provided from the anode of SCR1 through windings $1_3$ and $1_5$; from the anode of SCR2 through windings $1_6$ and $1_5$; from the anode of SCR3 through windings $1_6$ and $1_4$; and from the anode of SCR4 through windings $1_3$ and $1_4$.

Thus, when the first stage of the ring counter 21 is energized to gate SCR1 a current path is provided for the current applied at the winding's common point through windings $1_3$ and $1_5$, and through SCR1 to the ground reference. Similarly, SCR's2–4 are gated in response to stepping of the counter to energize the other windings in the appropriate sequence.

In this manner, successive pulses on lead 12 step the counter 21 forwardly to successively gate the SCR's, SCR1 through SCR4, to energize the motor's winding so that the motor is driven clockwise. Similarly, successive pulses on lead 12' step the counter 21 in its opposite and reverse direction to successively gate the SCR's, SCR4 through SCR1, to energize the motor's winding so that the motor is driven counterclockwise.

The pulses on leads 12 and 12' are obtained from that portion of the D.C. motor's control circuit shown in FIG. 5. As may be seen, the elements making up the circuit in FIG. 5 essentially coincide with the elements making up the A.C. motor's control circuit.

Referring to FIG. 5 and the modified embodiment shown, terminals A', B', and C' receive the D.C. signals on lines 17a and 17b from the pulse duration controller 7 shown in FIG. 1. Terminal C' is connected to line 17c for a ground. A D.C. signal applied to terminal A' from line 17a indicates that the motor is to be driven in the clockwise direction for positioning the rotary valve and a D.C. signal applied to input terminal B' from lead 17b indicates that the motor is to be driven in the counterclockwise direction. Besides receiving input signals on terminals A', B', and C', the control circuit shown in FIG. 5 receives a positive D.C. voltage from a lead 18. Preferably, this lead 18 voltage is +20 volts as are the signals applied to terminals A' and B'.

As shown in FIG. 5, terminal A' has associated therewith a switching subcircuit indicated by the block I, a timing subcircuit indicated by K, and driving circuit indicated by L. Similar corresponding circuits I', K', and L' are associated with terminal B'. These subcircuits have corresponding ones in FIG. 3 associated with the A.C. motor of FIG. 2.

The three subcircuits I, K, and L and their interconnecting elements operate to apply pulses to lead 12 to step the counter 21 (FIG. 4) in response to a signal on terminal A'. Similarly, subcircuits I', K', and L' and their interconnecting elements operate to apply pulses on lead 12' to step the counter in a reverse manner in response to a signal on terminal B'. Since the elements associated with terminal B' correspond to those associated with terminal A', only those associated with terminal A' will be described. Each element associated with terminal B' has been given the same reference numeral as its corresponding element associated with terminal A' except that it is primed.

Subcircuit I of FIG. 5 contains essentially the same components as subcircuits F and F' in FIG. 3. A transistor Q21 is provided with its base connected to terminal A', its collector electrode connected to the base of another transistor Q22, and its emitter electrode connected through a resistor R30 to ground. The emitter electrode of transistor Q21 is connected to the positive constant voltage on lead 18 and the collector electrode of transistor Q22 is connected to provide a signal to the timing subcircuit K. Switching subcircuit I acts to apply voltage from the lead 18 to the timing and driving subcircuits K and L via the collector of transistor Q22 in response to a signal on input terminal A'. Resistor R30 in subcircuit I serves to limit the emitter-base current of transistor Q22.

The driving subcircuit L is similar to subcircuits E and E' in FIG. 3, and comprises a leg connected between the output of the switching subcircuit I and ground and consisting of a resistor R39 and a capacitor C15. The driving subcircuit L also includes a second leg in parallel with the first and containing a resistor R38, a unijunction transistor Q26 and another resistor R37. As shown, the emitter of the unijunction transistor Q26 is connected to a junction between the capacitor C15 and resistor R39 and to the timing subcircuit K. Driving subcircuit L operates to provide a pulsing signal from lead 12 to step the ring 21 in FIG. 4 forward and to drive the D.C. motor in a clockwise direction. The unijunction transistor Q26 is oscillated at a frequency determined by the values of resistor R39 and capacitor C15 to provide the pulsed signal on lead 12.

Thus, while a signal is received at input terminal A', switching subcircuit I turns on to cause oscillations in subcircuit L for providing a pulsed signal on lead 12. This, of course, causes the ring counter to advance forwardly and the motor to be driven in a clockwise direction. As noted above, a deficiency in the prior art which is overcome with the invention is that previous electromechanical valve positioning apparatus continued to drive the motor indefinitely to position the valve even after the valve was at a maximum or seated position. To overcome this problem, the invention includes the timing sub-circuit K in the D.C. motor embodiment. Of course, this timing subcircuit K is comparable to subcircuits D and D' in the A.C. motor embodiment.

As shown in FIG. 5, the timing subcircuit K includes a resistor R32, a blocking diode D26 and a timing capacitor C14 connected between ground and the output of switching subcircuit I. The timing subcircuit also includes a unijunction transistor Q23 having its emitter connected to a junction between the diode D26 and capacitor C14. A resistor R33 is connected between lead 18 and the unijunction transistor Q23. A further resistor R31 is connected between the unijunction transistor Q23 and the gate electrode of an SCR Q24. The timing subcircuit K and, more particularly, the time constant of R32C14 determines the maximum amount of time which the motor may be driven in response to an input signal at terminal A' without an intervening signal being provided at terminal B'. When the switching subcircuit I goes on in response to a signal at A', the timing capacitor C14 is charged through resistor R32 until the firing level of the unijunction transistor Q23 is reached. When the firing level of Q23 is reached, the capacitor C14 discharges and a pulse is fed through resistor R31 to the gate electrode of the SCR Q24.

The blocking diode D26 is provided to prevent discharge of the capacitor C14 during any intervals which may occur when the switching subcircuit I is off and a signal does not appear at terminal A'. Resistor R33 connected between lead 18 and the unijunction transistor Q23 maintains the firing level of the unijunction transistor and prevents its firing as the switching subcircuit I and transistor Q22 turn off.

As illustrated, the anode of SCR Q24 is connected via a diode D28 to the junction between the resistor R39 and capacitor C15 and to the emitter of the unijunction transistor Q26 in the driving subcircuit L. When the SCR receives its gating pulse, it drops the voltage at the emitter of unijunction transistor Q26 to prevent it from oscillating so that the driving subcircuit L stops providing pulses to the counter from lead 12. In this manner, charging of the capacitor C14 while a signal is received at terminal A' to the firing level of the unijunction transistor Q23 gates SCR Q24 to terminate the pulsing signal on lead 12 for driving the motor in a clockwise direction. Thus, after a predetermined quantity of input signals are received at terminal A', the motor is no longer able to be driven clockwise.

Resistor R34 connected between the lead 18 and SCR Q24 ensures that sufficient current is maintained through the SCR to keep it in its gated state when the switching subcircuit I is off. The diode D28 and another diode D27 connected between resistor R34 and capacitors C15 and C14, respectively, serve blocking functions preventing charging of capacitors C14 and C15 through resistor R34 when the SCR Q24 is not gated.

Once gated by a pulse through resistor R31, SCR Q24 will remain in its state preventing clockwise driving of the motor by forward stepping of the counter until it is reset. During this state it also prevents further charging of capacitor C14 by maintaining the voltage at the emitter of Q23 below its firing level. Resetting of Q24 is accomplished by a pulse on lead 20 which is connected between terminal B' and through a resistor R36 to the base of a transistor Q25 which is connected with its emitter electrode at ground and its collector electrode at the anode of the SCR Q24. In response to a signal from terminal B' on lead 20, the transistor Q25 will switch to drop the current passing through SCR Q24 and thereby reset it to its initial non-gated state. The motor may thereafter be driven clockwise in response to signals at terminal A'.

It should also be noted that each successive resetting of Q24 causes the voltage at the emitter of Q23 to drop below its firing level causing C14 to be discharged to its initial state.

As may be seen, by choosing resistor R32 and capacitor C14, the amount by which the motor may be continually driven in the clockwise direction may be set so that continual indefinite pulsing of the motor driving the valve against its seat is avoided.

Of course, the corresponding elements associated with terminal B' shown in FIG. 5 operate in the same manner as disclosed above. Switching subcircuit I' applies positive voltage to the timing and driving subcircuits K' and L', in response to a signal at terminal B'. This causes the driving subcircuit L' to drive the counter in its reverse direction to drive the motor counterclockwise. When the timing capacitor C14' is sufficiently charged to fire unijunction transistor Q23' and gate SCR Q24', the motor can no longer be driven counterclockwise until a signal occurs on terminal A' which resets the SCR Q24'.

Referring to FIG. 6, the preferred positive voltage source for lead 18 shown in FIG. 5 is provided by a voltage reducing transformer T5 which receives on its primary winding a 115 volt, 60 cycle (or 220 volt, 50 cycle) A.C. signal. The output of the transformer T5 is rectified by diodes D21–D24 connected across its secondary winding. The rectified output from diodes D21–D24 is applied to lead 18 after being filtered by a capacitor C13 connected across the diodes and regulated by a resitor R50 in series with a zenier diode Z22 and in parallel with the capacitor. Lead 22 is connected as shown to provide the D.C. motor with a driving voltage as illustrated in FIG. 4.

Figure 7:
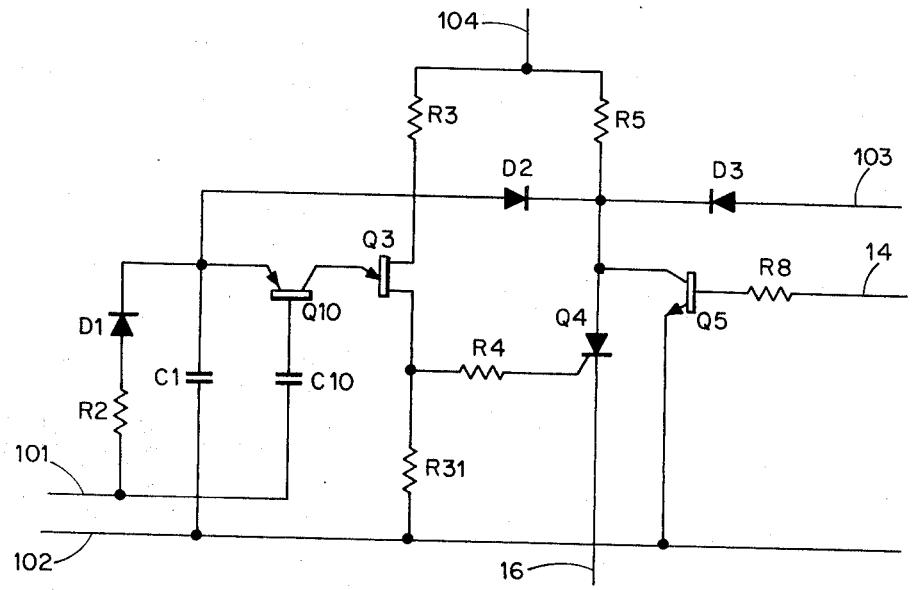
FIGS. 7 and 8 are schematic diagrams of modifications of the circuit shown in FIG. 3.
Figure 8:
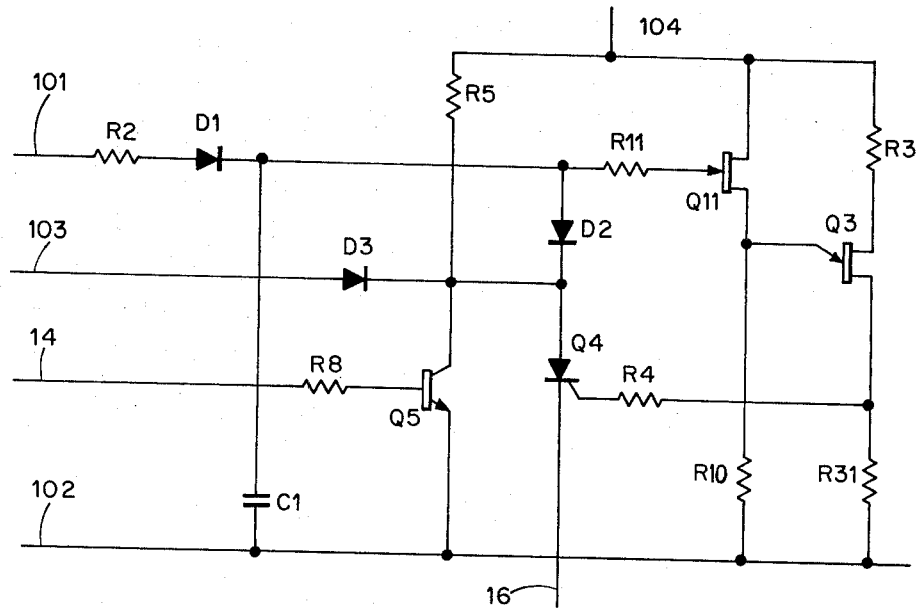

FIGS. 7 and 8 illustrate two modifications of the timing subcircuit D and associated circuitry shown in FIG.

3. Elements in FIG. 7 and FIG. 8 corresponding to elements in FIG. 3 are given the same reference numeral. Both FIGS. 7 and 8 have their elements arranged somewhat different than their corresponding elements in FIG. 3. However, the elements obviously are connected in the same and correct manner. In both FIGS. 7 and 8, lead 101 is from transistor Q2 in the switching subcircuit F shown in FIG. 3. Lead 102 is a ground to terminal C with lead 103 being connected to the emitter of unijunction transistor Q6 in the driving subcircuit E. Similarly, lead 14 is from the input terminal B of FIG. 3 and lead 16 is applied to the base of transistor Q15 in FIG. 3 for regulating the braking of the motor.

In FIG. 7, isolation of the timing capacitor C1 from the unijunction transistor Q3 to prevent leakage of the charge on the capacitor through the emitter-base of Q3 when the capacitor is not being charged is provided by a switching transistor Q10 which has its emitter connected to the timing capacitor C1, its collector connected to the emitter of the unijunction transistor Q3 and its base electrode connected, via a capacitor C10, to lead 101 on which is received the positive voltage charging the capacitor from the switching subcircuit F. In the absence of a signal applied to its base electrode, transistor Q10 isolates the timing capacitor C1 and the unijunction transistor Q3.

In the modification of FIG. 8, the timing capacitor C1 is isolated from the unijunction transistor Q3 to prevent leakage of the charge on the capacitor when it is not receiving a charging voltage by a field effect transistor Q11, and resistors R10 and R11. The field effect transistor Q11 has its drain and source electrodes connected to the emitter electrode of the unijunction transistor Q3 and to the +V source from lead 104. The gate of the field effect transistor is connected through the resistor R11 to the timing capacitor C1 so that a charge on C1 gates the field effect transistor into conduction and effects firing of the unijunction transistor Q3.

Of course, modifications similar to those shown in FIGS. 7 and 8 may be made with respect to the other timing subcircuit D' in FIG. 3 and with respect to timing subcircuits K and K' in FIG. 5.

It will be appreciated that various changes in the form and details of the above described preferred embodiments may be effected by persons of ordinary skill in the art without departing from the true spirit and scope of the invention.

We claim:

1. A bidirectional motor control circuit comprising:
first means for receiving first signals which indicate that the motor is to be driven in a first direction;
second means for receiving second signals which indicate that the motor is to be driven in a second direction;
a first drive circuit, responsive to said first receiving means; for driving the motor in said first direction while said first signals are being received;
a second drive circuit, responsive to said second receiving means, for driving the motor in said second direction while said second signals are being received;
a first timing circuit responsive to said first receiving means and adapted to disable said first drive circuit after said first signals have been received for a predetermined period;
a second timing circuit responsive to said second receiving means and adapted to disable said second drive circuit after said second signals have been received for a predetermined period;
first means for resetting said first timing circuit in response to said second receiving means receiving a second signal;
second means for resetting said second timing circuit in response to said first receiving means receiving a first signal; and
means for braking said motor when neither said first nor said second signals are being received by said first and second receiving means or when one of said drive circuits is disabled.

2. The control circuit as recited in claim 1 wherein:

the motor comprises a plurality of coils which are adapted to receive an alternating voltage for driving the motor; and wherein said braking means comprises:
a source of D.C. voltage,
at least one gate adapted to apply said D.C. voltage to at least one of said coils to brake the motor, and
means for periodically enabling said gate when said first and second signals are not being received or when one of said drive circuits is disabled.

3. The control circuit as recited in claim 2 wherein said D.C. voltage is periodically applied to all said coils by said gate.

4. A bidirectional motor control circuit comprising:

first means for receiving first signals which indicate that the motor is to be driven in a first direction;
second means for receiving second signals which indicate that the motor is to be driven in a second direction;
a first drive circuit, responsive to said first receiving means, for driving the motor in said first direction while said first signals are being received;
a second drive circuit, responsive to said second receiving means, for driving the motor in said second direction while said second signals are being received;
a first timing circuit responsive to said first receiving means and adapted to disable said first drive circuit after said first signals have been received for a predetermined period;
a second timing circuit responsive to said second receiving means and adapted to disable said second drive circuit after said second signals have been received for a predetermined period;
first means for resetting said first timing circuit in response to said second receiving means receiving a second signal; and
second means for resetting said second timing circuit in response to said first receiving means receiving a first signal; each said timing circuit comprising:
a capacitor,
means for charging said capacitor while said timing circuit's associated signal is being received,
a circuit element connected to said capacitor and adapted to fire an output in response to said capacitor being charged to a predetermined level, and
gating means adapted to be operated in response to firing of said element for disabling the drive circuit associated with said timing circuit when said capacitor has been charged to said predetermined level; each said timing circuit further including a blocking diode for preventing discharge of said capacitor while said timing circuit's associated signal is not being received and when said charging means is inoperative.

5. A bidirectional motor control circuit comprising:

first means for receiving first signals which indicate that the motor is to be driven in a first direction;
second means for receiving second signals which indicate that the motor is to be driven in a second direction;
a first drive circuit, responsive to said first receiving means, for driving the motor in said first direction while said first signals are being received;
a second drive circuit, responsive to said second receiving means, for driving the motor in said second direction while said second signals are being received;
a first timing circuit responsive to said first receiving means and adapted to disable said first drive circuit after said first signals have been received for a predetermined period;
a second timing circuit responsive to said second receiving means and adapted to disable said second drive circuit after said second signals have been received for a predetermined period;
first means for resetting said first timing circuit in response to said second receiving means receiving a second signal; and
second means for resetting said second timing circuit in response to said first receiving means receiving a first signal; each said timing circuit comprising:
a capacitor,
means for charging said capacitor while said timing circuit's associated signal is being received,
a unijunction transistor connected to said capacitor and adapted to fire an output in response to said capacitor being charged to a predetermined level, and
gating means adapted to be operated in response to firing of said unijunction transistor for disabling the drive circuit associated with said timing circuit when said capacitor has been charged to said predetermined level; each said timing circuit further including
means for isolating said capacitor from said unijunction transistor when said capacitor is not being charged to avoid leakage of the charge on said capacitor.

6. The control circuit as recited in claim 5 wherein said isolating means comprises a switching transistor connected between said capacitor, said unijunction transistor and said charging means, said switching transistor being adapted to operatively connect said capacitor and unijunction transistor only during operation of said charging means.

7. The control circuit as recited in claim 5 wherein said isolating means comprises:
a voltage source;
a field effect transistor connected to said voltage source and between said capacitor and said unijunction transistor such that said field effect transistor is gated by the charge on said capacitor to pass a voltage corresponding to said charge to said unijunction transistor.

8. A time motor control circuit comprising:
means for driving the motor;
a capacitor;
means for charging said capacitor, said charging means adapted to operate intermittently and further including
a blocking diode for preventing discharge of said capacitor when said capacitor is not being charged;

a circuit element connected to said capacitor and adapted to fire an output in response to said capacitor being charged a predetermined level; and
gating means adapted to be operated in response to firing of said element for controlling said driving means when said capacitor has been charged to said predetermined level.

9. A timed motor control circuit comprising:
means for driving the motor;
a capacitor;
means for charging said capacitor;
a unijunction transistor connected to said capacitor and adapted to fire an output in response to said capacitor being charged to a predetermined level;

gating means adapted to be operated in response to firing of said unijuntion transistor for controlling said driving means when said capacitor has been charged to said predetermined level; and
means for isolating said capacitor from said unijunction transistor when said capacitor is not being charged to avoid leakage of the charge on said capacitor.

10. The control circuit as recited in claim 9 wherein said isolating means comprises a switching transistor connected between said capacitor, said unijunction transistor, and said charging means, said switching transistor being adapted to operatively connect said capacitor and unijunction transistor only during operation of said charging means.

11. The control circuit as recited in claim 9 wherein said isolating means comprises:
a voltage source;
a field effect transistor connected to said voltage source and between said capacitor and said unijunction transistor such that said field effect transistor is gated by the charge on said capacitor to pass a voltage corresponding to said charge to said unijunction transistor.

\* \* \* \* \*